May 12, 1970 P. THOME 3,511,091
DEVICE FOR MONITORING PARALLEL TUBULAR ELEMENTS
Filed June 9, 1966 4 Sheets-Sheet 1
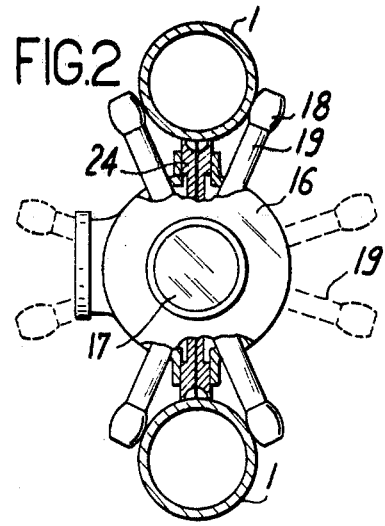
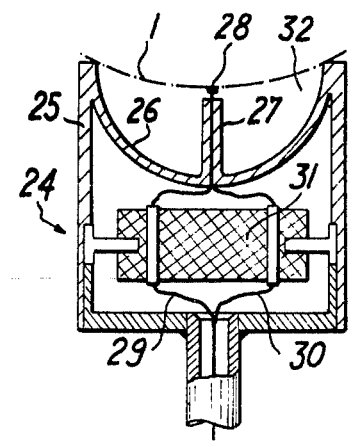
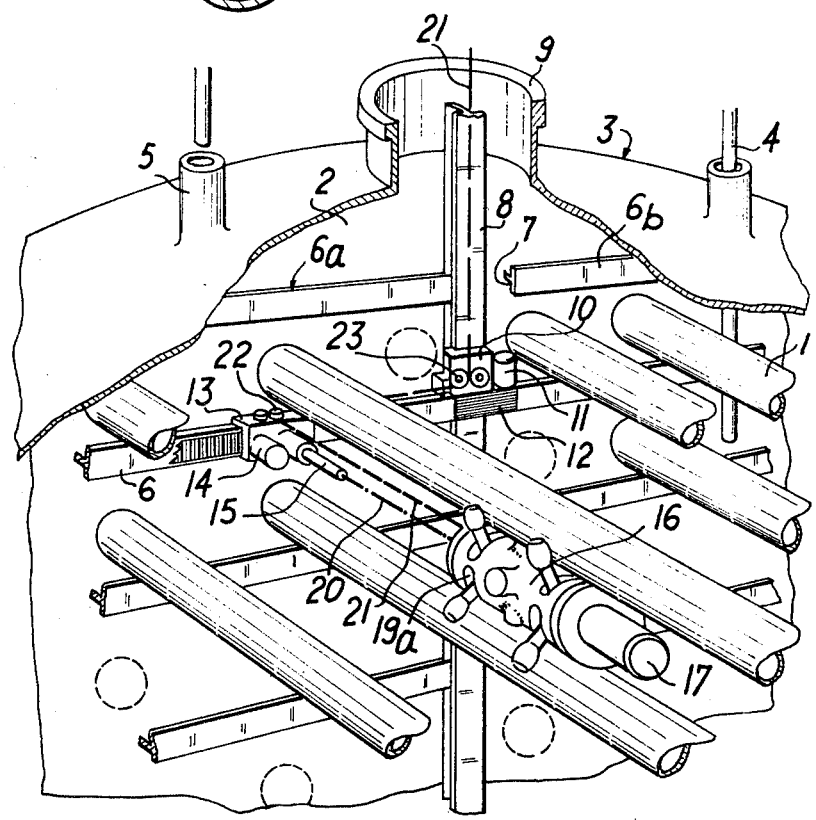

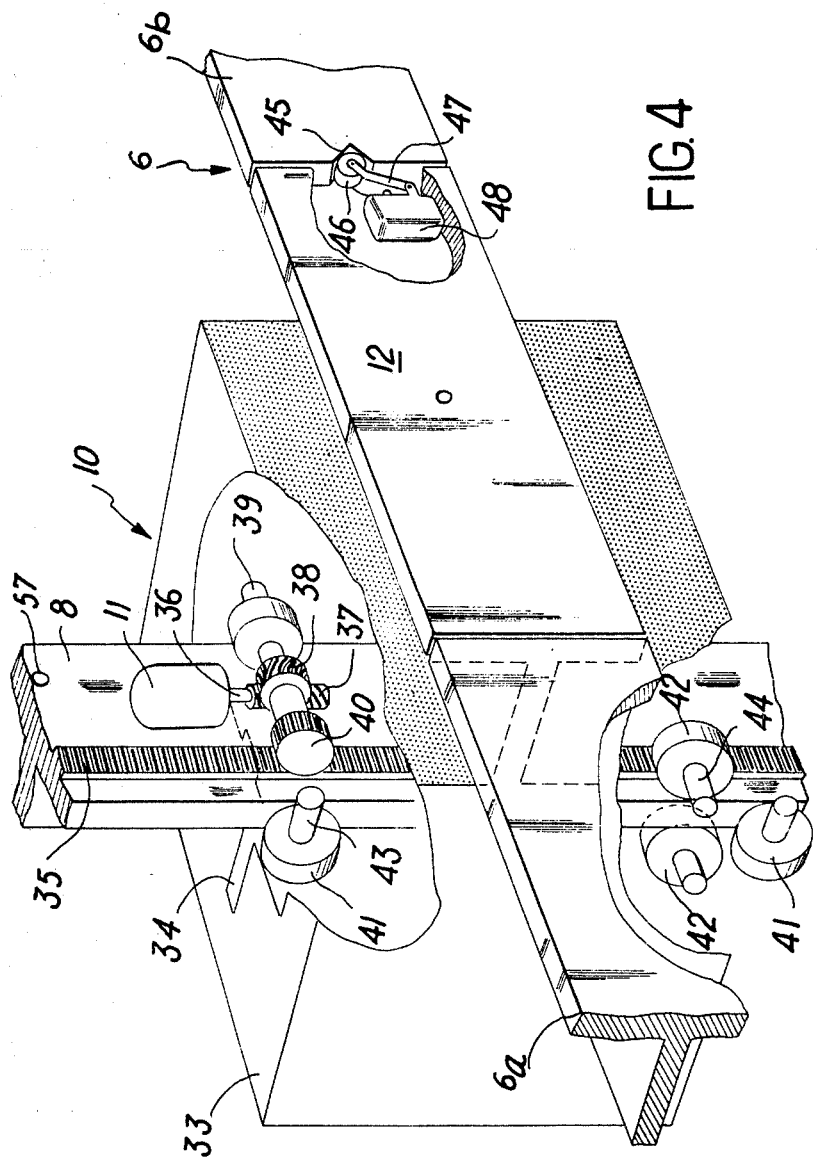

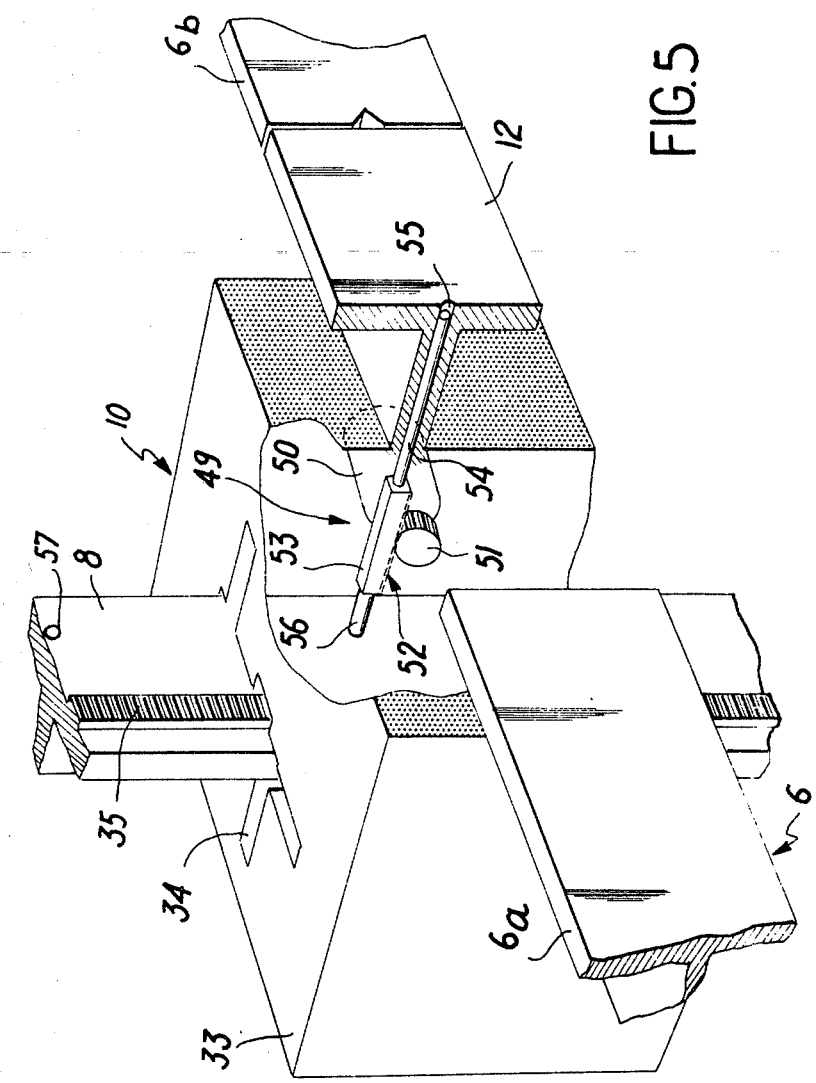

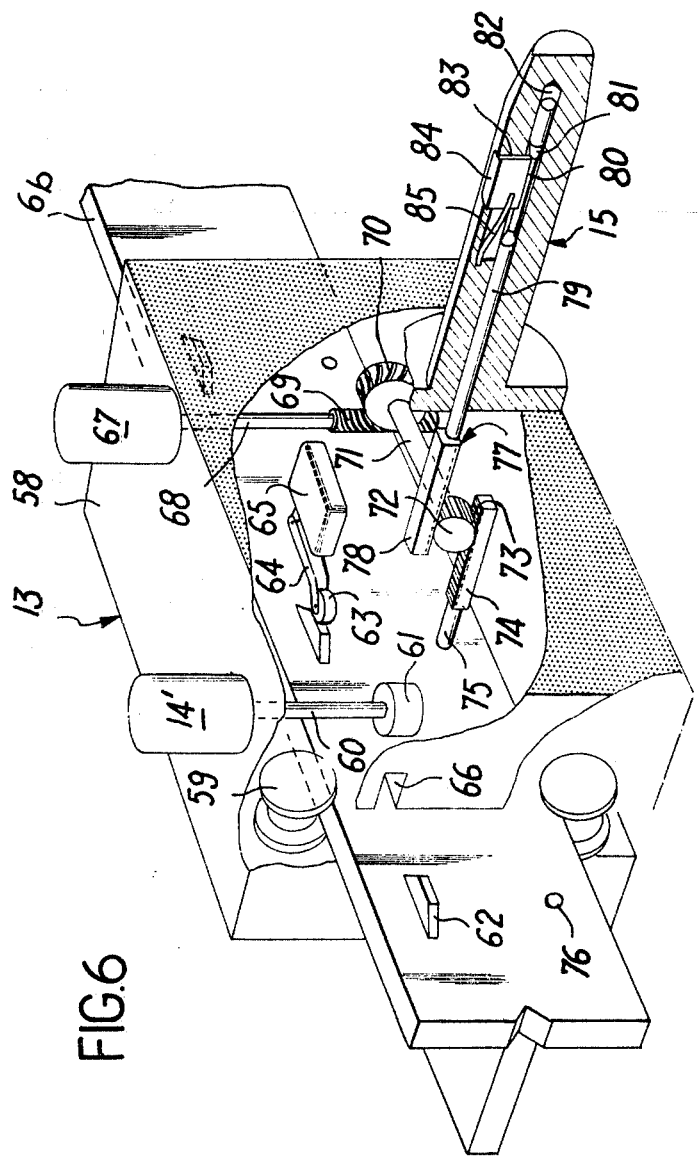

United States Patent Office 3,511,091
Patented May 12, 1970

1

3,511,091
DEVICE FOR MONITORING PARALLEL
TUBULAR ELEMENTS
Paul Thome, Saint-Cloud, France, assignor to Commissariat a l'Energie Atomique, Paris, France
Filed June 9, 1966, Ser. No. 556,440
Claims priority, application France, June 24, 1965, 22,183; May 3, 1966, 60,131
Int. Cl. G01k 1/14
U.S. Cl. 73—343           9 Claims

ABSTRACT OF THE DISCLOSURE

Tubular elements in a cluster are monitored by probes mounted on a moving trolley rolling on two adjacent tubular elements. A self-contained driving mechanism moves the trolley. A series of rails at right angles to each other are disposed in a plane at right angles to the tubular elements and carry units for transferring the trolley between any two adjacent tubular elements within the tube cluster.

---

This invention relates to devices for monitoring the physical characteristics of tubular elements and especially their heat insulation when said elements are placed in locations which are not readily accessible. The invention is primarily concerned with the monitoring devices which are employed in nuclear reactors for the purpose of following variations in the physical properties of elements referred-to as "pressure tubes" which form structural assemblies in reactors of this type. As a rule, said pressure tubes are disposed in a uniform array or "cluster" within a reactor tank containing a liquid neutron-moderating medium and enclose fuel cartridges which are cooled by a flow of pressurized gas.

The main object of the invention is to reduce the overall size of devices of the type mentioned above and to improve their convenience of operation between the parallel pressure tubes of the cluster as well as the possibilities of inserting and withdrawing said devices from the reactor tank, whether the reactor is in operation or shut down.

To this end, a device for monitoring parallel tubular elements disposed in a cluster in a regular lattice, of the type comprising retractable probes which are brought into contact with said tubular elements, is characterized in that said probes are carried by a moving trolley fitted with rollers which are applied against two adjacent tubular elements, said trolley comprising a self-contained mechanism for driving said rollers so as to produce the translational motion of said trolley along said two adjacent tubular elements, and is further characterized in that means constituted by a series of rails oriented in two directions at right angles to each other are disposed in a plane at right angles to the aforesaid tubular elements and are adapted to carry units for transferring said trolley from one position to another between any two adjacent tubular elements within said tube cluster.

Preferably, said means are disposed in a plane located close to one of the ends of said tube cluster. In addition, the aforesaid transfer units which are secured to the transfer rails are constituted by a first movable carrier-plate unit comprising means for producing the displacement of said carrier-plate unit along a first rail and by a second carrier-plate unit which is also provided with means for producing the displacement of said second carrier-plate unit along a second rail located at right angles to said first rail, said trolley being coupled to said first carrier-plate unit and said first carrier-plate unit being coupled to said second carrier-plate unit in such

2 a manner as to ensure that said trolley is positioned at any predetermined point of said tube cluster.

A clear understanding of the invention will in any case be gained from the complementary description which follows and which is given primarily by way of example, reference being had to the accompanying drawings, in which:

FIG. 1 is a diagrammatic view of the essential elements of a pressure tube nuclear reactor comprising a monitoring device which is constructed in accordance with the invention;

FIG. 2 is a partial transverse sectional view of the moving trolley which forms part of the device shown diagrammatically in FIG. 1, this view being taken on a larger scale;

FIG. 3 shows a detail of the trolley of FIG. 2, this view being taken on a still larger scale;

FIGS. 4 and 5 are two views in perspective in enlarged detail of the first carrier-plate unit;

FIG. 6 is a view in perspective in enlarged detail of the second carrier-plate unit.

In FIG. 1, there is shown diagrammatically a portion of a nuclear reactor comprising a nest or cluster of horizontal pressure tubes such as the pressure tube 1 which are placed in a regular lattice, preferably with a square pitch, and supported by the end-plates 2 of a tank 3 which surrounds said tube cluster and which contains a liquid neutron-moderating medium (moderator) in which said pressure tubes are immersed.

As will be apparent, and as is standard practice in an arrangement of this type, the pressure tubes 1 serve to insulate from the moderator the fuel elements or cartridges (not shown) which constitute the active portion of the reactor, said fuel elements being cooled by a circulation of a gas under pressure. The pressure tubes 1 must, under these conditions, ensure good heat insulation of the moderator with respect to the heat removed from the fuel elements during operation of the reactor; and it is precisely with a view to monitoring this heat insulation while the reactor is at power that the device according to the invention is fitted.

Accordingly, the devices which are employed for the purpose of measuring the thermal flux which passes through the outer surfaces of the pressure tubes are designed on the principle of monitoring and measuring thermocouple probes which come into contact with said tubes. One form of construction of a device of this type will be described later. It can nevertheless be observed in this connection that it must be made possible to take measurements on each pressure tube by means of an apparatus which introduces only a minimum quantity of neutron-absorbing material between said tubes. Moreover, an apparatus of this type must permit of easy replacement or removal from the reactor tank during operation of this latter. Finally, emphasis should be laid on the fact that the locations to be monitored are particularly inaccessible in the application which is more specifically contemplated, by reason of the lattice pitch on which the pressure tubes are distributed and the presence among said tubes of elements such as safety rods or control rods as designated by the reference 4, or elements of other types, which traverse the tank 3 through openings 5 and which are intended for the control of reactivity and regulation of the reactor. Finally, it is necessary to provide means whereby the monitoring apparatus can be withdrawn from the reactor tank each time it proves desirable to carry out inspections, repairs or replacements after irradiation.

Taking into account the problems of overall size which have been referred-to above, the monitoring device is constructed by adopting the following arrangements:

The end-plate of the reactor tank 2 is first of all rigidly fixed to an assembly of guide rails comprising in the first place a series of first parallel rails 6 which, in the example of construction which is more especially considered in FIG. 1, are horizontal. In fact, each rail 6 is made up of two half-rails 6a and 6b having the same length which are separated along a vertical plane which passes through the axis of the corresponding reactor tank end-plate by a gap 7 within which is disposed a second rail 8 having an orientation at right angles to the first rails 6. The assembly which is thus formed constitutes a distribution system between the pressure tubes 1 in two respectively horizontal and vertical directions at right angles to each other, the single vertical rail being intended to service as many horizontal rails as may prove necessary for the purpose of associating therewith either one or two successive horizontal rows of pressure tubes. A driving system is designated to travel along said distribution system. Said driving system is made up of a number of parts comprising in particular a moving trolley which carries the monitoring and measuring probes for the purpose of checking the heat insulation of the pressure tubes during operation of the reactor.

With more specific reference to the driving system mentiond above, said system is made up of a number of independent transfer units which are primarily intended to avoid the use of moving parts permanently attached to the end-plates 2 of the reactor 3, with a view to ensuring safety, reliability and length of service of the equipment employed. For the same reasons, said transfer units can engage with the rails 6 and 8 only in the operating position so that, in the event of failure, and subject to certain conditions, said units can be automatically withdrawn from the reactor tank by simple and sturdy mechanical means.

With the above object in mind, provision is made at the top portion of the reactor tank for an opening 9 of suitable diameter which is preferably located in the line of extension of the vertical rail 8. Thus, direct access to the interior of the tank is permitted through any suitable shielding and sealing system. Furthermore, the transfer units comprise auxiliary safety and locking devices which are mainly shown in FIGS. 4 and 6 and which will be discussed hereinafter.

In their most simplified mode of construction, the transfer units are constituted by automative carrier-plates which are capable of engaging the rails 6 and 8 independently across the entire nest of tubes 1. There is thus disposed on the vertical rail 8 a first moving carrier-plate unit 10 equipped with a driving motor 11 for producing the rotation of a pinion which is not shown in the drawings, said pinion being capable of engaging a toothed rack (omitted from FIG. 1 but shown in FIGS. 4 and 5) which is carried by the rail 8 in such a manner that said carrier-plate unit 10 is capable of moving on said rail along the entire length of this latter either in the downward or upward direction. The motor 11 is supplied with current by any suitable means and especially by means of a cable (not shown) which is connected to a voltage source located externally of the reactor tank by way of the opening 9. The carrier-plate unit 10 is provided with a flat flange 12 which has the same width as the horizontal rails 6 and a length such as to permit said carrier-plates unit to move exactly in the manner of a switch and to establish a junction between any two horizontal half-rails 6a and 6b by taking up a position within the gap 7 which is located between said two half-rails.

There is mounted on said flange 12 of the first carrier-plate unit 10 a second moving carrier-plate unit 13 which is also equipped with a driving motor 14 located schematically in FIG. 1 for producing the rotation of a pinion (not shown in FIG. 1) which, by cooperating with a toothed rack (shown in part only) carried by the two corresponding half-rails 6a and 6b, permits the displacement of said second carrier-plate unit 13 when, as will be understood, the flange 12 is placed exactly between the two half-rails aforesaid. An electric cable (not shown) also serves to effect the supply of current to the motor 14 in a manner which is independent of the supply to the motor 11. The carrier-plate unit 13 carries a shaft 15 which is disposed at right angles to said carrier-plate unit, that is to say in parallel relation with the pressure tubes 1, said shaft being intended to carry a trolley 16, the constructional design of which is shown in FIG. 2 in greater detail.

From this figure, it can be seen that said trolley consists of a body of generally cylindrical shape which is fitted at one end with an electric motor 17 which produces the rotation of rollers such as the roller 18 by means of a mechanical transmission system (which has not been shown in the drawings). Said rollers are four in number in the example of construction under consideration and are intended to bear against the outer surfaces of two adjacent pressure tubes. To this end, each roller is mounted on a retractable shaft 19 which is capable of radial displacement within a slot 19a of the trolley body so as to take up during operation one of the two positions which are shown in full lines or broken lines in FIG. 2. The radial displacement of each shaft 19 is carried out by any suitable means which are preferably put into operation at the time of engagement of the trolley 16 on the shaft 15 carried by the second moving carrier-plate unit 13. The supply of electric current to the motor 17 is carried out by means of a cable 20 which connects the trolley 16 to the carrier-plate unit 13. As a safety measure in the event of failure of one of the electric motors, a second cable 21 which is guided on the carrier-plate unit 13 and on the carrier-plate unit 10 by means of pulleys respectively designated as 22 and 23 is provided with a view to exerting a simple tractive effort so as to bring back the trolley 16 on its shaft 15 and then to return the carrier-plate units 13 and 10 towards the exterior of the reactor tank, as will be explained in detail below. Finally, the trolley 16 is fitted with two monitoring and measuring probes 24 which are retractable and controlled from the interior of the trolley 16 so as to come into contact with the outer surfaces of the pressure tubes 1, as shown in FIG. 2.

With reference in particular to the constructional design of the above-mentioned measuring probes, the arrangement which is illustrated in FIG. 3 can be adopted by way of example. In accordance with this arrangement, each probe comprises a casing 25 having a cylindrical face 26 provided at its center with a guide 27 for a thermocouple 28, the leads 29 and 30 of said thermocouple being passed through an insulating support 31 and connected to a measuring and recording apparatus (which has not been illustrated in the drawings). In the operating position, that is to say when the probe is in contact with the wall of a pressure tube 1, the face 26 of the casing delimits an enclosed space 32 within which the equilibrium of the established thermal state is monitored, especially by measuring the temperature rise time by means of the thermocouple 28 so as to deduce therefrom the extent of variation of the thermal flux which is produced at the surfaces of the pressure tubes. The flux measurement is thus identified with a recording of a temperature rise curve. As is apparent, the operation of the apparatus entails preliminary calibration depending on the nature of the materials of construction and on the configuration of the probes employed.

The installation and operation of the complete device can readily be deduced from the foregoing explanations. There is first placed in position on the vertical rail 8 which passes out of the reactor tank through the opening 9 the first carrier-plate unit 10, the flange 12 of which supports the second carrier-plate unit 13 which in turn supports the trolley 16 by means of its shaft 15, the rollers 18 of said trolley being located in the outwardly displaced position which corresponds to the position shown in broken lines in FIG. 2. The assembly of the three elements 10, 13 and 16 then moves vertically along the rail 8 under the action of the motor 11 and is arrested by means of an adequate locking system opposite to a horizontal rail 6 which has been previously selected. In this position, the flange 12 is located exactly in the line of extension of the two corresponding half-rails 6a and 6b and, as a result of the controlled operation of the motor 14, permits the horizontal displacement of the carrier-plate unit 13 which is still fitted with the trolley 16. It should be noted that, during this displacement, the first carrier-plate unit 10 remains locked on the rail 8 and so remains as long as the carrier-plate unit 13 has not returned to its flange 12, that is to say to its starting position. In this last-mentioned position, there only takes place the mechanical release of the carrier-plate unit 10 by means of a magnetic latch or pawl system of which one example will be given later, whereas said carrier-plate unit nevertheless remains engaged by means of its pinion with the toothed rack of the rail 8.

The carrier-plate unit 13 on the rail 6 which is selected behaves in a manner which is similar to the carrier-plate unit 10 and can in particular be brought into any pre-established position with respect to the positions of the pressure tubes. Inasmuch as the carrier-plate unit is then locked in this position, the rollers 18 of the trolley 16 move radially outwards so as to bear against two pressure tubes 1 which are in oppositely-facing relation and places the measuring probes 24 in contact with said pressure tubes. From this moment, the movement of displacement of the trolley 16 between the two pressure tubes can be carried out by means of the motor 17 which is supplied with current by the cable 20, thereby permitting the probes 24 to monitor the heat insulation.

It is thus possible to change over from one assembly of any two adjacent tubes to any other assembly of two adjacent tubes inside the reactor tank by means of the transfer units which are constituted by the carrier-plate units 10 and 13 and the trolley 16 which are each free to move in a direction respectively at right angles to the two other units, by the distribution system which is formed by the rails 6 and 8. In this connection, it should be pointed out that, in the event of failure of one of the motors 11, 14 and 17, it is merely necessary to exert a tractive effort on the cable 21 from the exterior of the reactor tank to permit successively the engagement of the trolley 16 on its shaft 15, the return of the carrier-plate unit 13 onto the flange 12 and the withdrawal of the carrier-plate unit 10 from the tank 3 through the outlet 9. In fact, as it moves along its shaft 15, the trolley 16 automatically returns its rollers 19 into the position in which they are located at a distance from the tubes by virtue, for example, of the presence of permanent magnets (not shown) carried by the carrier-plate unit 13. As the trolley 16 reaches the end of travel along its shaft 15, there also take place the mechanical release of the said carrier-plate unit 13 from its rail 6, then, once said carrier-plate unit has returned to its starting position, the mechanical release of the first carrier-plate unit 10 from its rail 8.

In practice, it is therefore of particular interest to have available an assembly of safety systems which permit of immediate location of each working position of the transfer units within the nest of tubular elements and the controlled locking and unlocking thereof in each of these positions.

The arrangements which can be made for this purpose are shown by way of example in FIGS. 4 to 6.

In FIG. 4, the first carrier-plate unit 10 is designed in the form of a parallelipipedal block 33 comprising a vertical passage 34 for the vertical rail 8 which has a T-shaped transverse cross-section. This rail is provided on its transverse portion with a toothed rack 35 which makes it possible to effect the accurate displacement of the carrier-plate unit by virtue of the electric motor 11, the shaft 36 of which is fitted with a pinion 37 which engages by means of a skew gear with a second pinion 38 which is keyed on a shaft 39 supported by the carrier-plate unit. A second spur pinion 40 is immovably fitted on said shaft 39 and engages directly with the toothed rack 35, thereby permitting the upward or downward motion of the carrier-plate unit 10 along the rail 8. It will be apparent that other equivalent mechanical arrangements could also be contemplated. For example, the motor 11 could be fitted with a spur pinion which is directly engaged with the toothed rack. The carrier-plate unit 10 is guided in its movement by means of a series of rollers such as the rollers 41 and 42 which are brought to bear against the two perpendicular faces of the rail, said rollers being mounted to rotate freely on shafts 43 or 44 which are supported by the carrier-plate unit.

As has already been noted, the flat flange 12 constitutes a junction switch between the two half-rails 6a and 6b of the second series of rails 6 which are at right angles to the first rail 8. In this second series, the rails are parallel to each other and spaced apart over a vertical distance which is defined by the pitch of the assembly of pressure tubes 1. The position-setting of the carrier-plate unit 10 along its vertical rail 8 is therefore made necessary in order that the flange 12 should accurately coincide with the line of extension of any two half-rails 6a and 6b of the second series. To this end, each of the two half-rails 6b, for example, is provided with a notch 45 in which is engaged a runner-wheel 46 mounted at the end of the lever of a micro-switch 48 which is carried by the flange 12, in particular by being housed within the thickness of said flange as shown in FIG. 4.

The position of the micro-switch which is either closed or open according as the runner-wheel 46 is located within the corresponding notch 45 or not, and the number of successive closures from a previously set starting position make it possible under these conditions to know with a high degree of accuracy the particular half-rail 6b in front of which the flange 12 is located and also to ensure that this latter is located exactly in the line of extension of the two half-rails 6a and 6b considered.

In FIG. 5, the carrier-plate unit 10 and its vertical guide rail 8 are again shown. However, there is more especially shown in this figure a locking member 49 which is carried by the carrier-plate unit 10 and which serves to lock this latter along its rail 8 in each of the positions of the carrier-plate unit which correspond to those in which the flange 12 is located exactly in the line of extension of two half-rails 6a and 6b. To this end, the carrier-plate unit 10 is equipped with a second motor 50, the shaft of which is fitted with a pinion 51 which engages with a toothed rack 52 formed in a key 53. Said key has an extension at one end in the form of a guide rod 54 which is adapted to slide within a bore 55 which is formed through the carrier-plate unit while the other end of said key is in the form of a rod 56 which is adapted to penetrate into holes such as the hole 57 which are formed at suitable intervals along the rail 8. In each set position of the carrier-plate unit 10 with respect to the rails 6a and 6b as defined by the micro-switch 48, the motor 50 is tripped, thereby locking the carrier-plate unit 10 with respect to the rail 8 by producing the displacement of the key 53 and the engagement of the rod 56 in the opposite hole 57.

FIG. 6 shows in perspective the second carrier-plate unit 13 which moves along the rails 6 located at right angles to the rail 8. Said carrier-plate unit 13 consists as in the case of the carrier-plate unit 10, of a parallelipipedal block 58 provided with a central opening which enables the carrier-plate unit to move along any rail 6 by being mounted astride said rail; guiding of the carrier-plate unit with respect to the rail is ensured by means of flanged rollers 59. As has already been stated, the carrier-plate unit is driven by means of an electric motor 14, the shaft 60 of which terminates in a friction roller 61 which is adapted to bear against the vertical surface of the rail. This construction may be used in place of the rack and pinion construction discussed above. Position-setting of the carrier-plate unit 13 along its rail is effected by means of bosses 62 which are formed in one piece with said rail and designed to cooperate with a runner-wheel 63 carried by the lever 64 of a micro-switch 65 which is fixed on the carrier-plate unit 13, the transition of the bosses 62 through the block 58 at the time of displacement of the carrier-plate unit being permitted by virtue of a recess 66 which is suitably formed within the thickness of said block.

The carrier-plate unit 13 is also equipped with a locking system which makes it possible in each position set by the micro-switch 65 to lock said carrier-plate unit on the rail 6. To this end, said carrier-plate unit is adapted to carry a second electric motor 67, the shaft 68 of which drives a shaft 71 by means of a pinion 69 and a gear-wheel 70. A spur pinion 72 is mounted on the end of said shaft 71 and engages with a toothed rack 73 which is formed on a key 74. Said key terminates in a rod 75 which is capable of engaging in holes 76 formed in the rail 6. In each position of the carrier-plate unit 13, the motor 67 is driven in rotation in such a manner as to produce the movement of displacement of the key 74 in the direction which effects the locking of the carrier-plate unit.

As can be seen from FIG. 6, the aforesaid locking of the carrier-plate unit 74 is accompanied by a second control operation as applied to the trolley 16 (not shown in this figure) which carries the monitoring and measuring probes. With this object in view, the pinion 72 cooperates with a second toothed rack 77 carried by a second key 78 which is disposed in parallel relation to the key 74 while said pinion 72 engages at the same time with the toothed rack 73 of the key 74. The above-mentioned key 78 has an extension in the form of a rod 79, the end of which has a portion 80 having a narrowed cross-section and terminating in a conical portion 81. The rod 79 is adapted to slide within a bore 82 which is formed axially in the supporting shaft 15 of the trolley 16 which forms parts of the carrier-plate unit 13, the shaft 15 being provided with an opening 83 for the purpose of accommodating a lug 84 which is acted upon by a spring 85. In the position which is illustrated in FIG. 6, the key 74 locks the carrier-plate unit 13 on the rail 6 whilst the portion 80 of the second key 78 which has a reduced cross-section is brought in front of the lug 84. Under these conditions, the spring 85 serves to withdraw the lug 84 with respect to the apparent contour of the shaft 15 and releases the trolley 16 which is carried on said shaft. Said trolley can then leave the shaft 15 and move between the tubes 1. On the other hand, the releasing of the carrier-plate unit 13 from the rail 6 initiates the movement of the keys 74 and 78 in opposite directions, thereby releasing on the one hand the rod 75 from the corresponding hole 76 and on the other hand causing the lug 84 to move away from the shaft 15 and to immobilize the trolley 16 with respect to the carrier-plate unit 13.

What I claim is:

1. A device for monitoring parallel tubular elements disposed in a cluster in a regular lattice, of the type comprising retractable probes which are brought into contact with said tubular elements, characterized in that said probes are carried by a moving trolley fitted with rollers which are applied against two adjacent tubular elements, said trolley comprising a self-contained mechanism for driving said rollers so as to produce the translational motion of said trolley along said two adjacent tubular elements, and further characterized in that means constituted by a series of rails oriented in two directions at right angles to each other are disposed in a plane at right angles to the aforesaid tubular elements and are adapted to carry units for transferring said trolley from a first position to another position between any two adjacent tubular elements within said tube cluster.

2. A monitoring device in accordance with claim 1, characterized in that said means are disposed in a plane which is located close to one of the ends of said tube cluster.

3. A monitoring device in accordance with claim 1, characterized in that said transfer units which are secured to the transfer rails are constituted by a first movable carrier-plate unit comprising means for producing the displacement of said carrier-plate unit along a first rail and by a second carrier-plate unit which is also provided with means for producing the displacement of said second carrier-plate unit along a second rail located at right angles to said first rail, said trolley being coupled to said first carrier-plate unit and said first carrier-plate unit being coupled to said second carrier-plate unit in such a manner as to ensure that said trolley is positioned at any predetermined point of said tube cluster.

4. A monitoring device in accordance with claim 3, characterized in that said means for producing the displacement of said carrier-plate units are electric motors which drive pinions engaged with toothed racks which are provided on said rails.

5. A monitoring device in accordance with claim 4, characterized in that it comprises safety means in the event of failure of said motors, said safety means consisting of a return cable which is guided by pulleys mounted on said carrier-plate units and which is fixed to said trolley.

6. A monitoring device in accordance with claim 3, characterized in that said carrier-plate units are fitted with actuators provided on said rails.

7. A monitoring device in accordance with claim 6, characterized in that said carrier-plate units comprise keys for locking said carrier-plate units with respect to said rails in positions determined by said micro-switches.

8. A monitoring device in accordance with claim 1, characterized in that said series of rails comprises a first single rail and a plurality of second rails at right angles to said first rail, each of said second rails being divided into two half-rails disposed on each side of said first rail.

9. A monitoring device in accordance with claim 8, characterized in that said first carrier-plate unit comprises a flat flange which forms a junction switch between two half-rails when said carrier-plate unit is placed opposite to said two half-rails.

References Cited

UNITED STATES PATENTS 1,594,518   8/1926   Hathaway _____ 15—104.04

LOUIS R. PRINCE, Primary Examiner

D. E. CORR, Assistant Examiner

U.S. Cl. X.R.
15—104.4